United States Patent
Onogi

(10) Patent No.: US 12,238,252 B2
(45) Date of Patent: Feb. 25, 2025

(54) IMAGE PROCESSING APPARATUS AND IMAGE PROCESSING METHOD

(71) Applicant: SHARP KABUSHIKI KAISHA, Sakai (JP)

(72) Inventor: Kenji Onogi, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 18/411,440

(22) Filed: Jan. 12, 2024

(65) Prior Publication Data
US 2024/0251046 A1    Jul. 25, 2024

(30) Foreign Application Priority Data

Jan. 19, 2023 (JP) .................................. 2023-006739

(51) Int. Cl.
*H04N 1/00* (2006.01)

(52) U.S. Cl.
CPC ..... *H04N 1/00822* (2013.01); *H04N 1/00814* (2013.01)

(58) Field of Classification Search
CPC ........................ H04N 1/00822; H04N 1/00814
USPC .................................................. 358/1.1–1.18
See application file for complete search history.

(56) References Cited

U.S. PATENT DOCUMENTS

| | | | | |
|---|---|---|---|---|
| 7,532,359 B2* | 5/2009 | Yuan | .................... | H04N 1/6027 358/1.9 |
| 2003/0204674 A1* | 10/2003 | Ryan | .................. | G11C 11/4076 711/167 |
| 2006/0132821 A1* | 6/2006 | Nonaka | ............. | H04N 1/00167 358/1.13 |
| 2007/0139684 A1* | 6/2007 | Shima | .................... | G06K 15/00 358/1.9 |
| 2008/0231885 A1* | 9/2008 | Truong | .................. | G06F 3/122 358/1.15 |
| 2012/0105914 A1* | 5/2012 | Sato | ......................... | G06F 1/12 710/61 |

FOREIGN PATENT DOCUMENTS

JP     2005-167841 A    6/2005

* cited by examiner

*Primary Examiner* — Gabriel I Garcia
(74) *Attorney, Agent, or Firm* — ScienBiziP, P.C.

(57) ABSTRACT

An image processing apparatus includes: a document conveyor that conveys a document; an image reader that reads an image of the conveyed document; at least one main memory; a data transfer circuit; and one or more controllers, whereas the controllers determine whether to read an image of each page in a first reading mode or a second reading mode, the first reading mode being a mode in which conveyance of the next document is started before reading of an image of a previous page is completed, the second reading mode being a mode in which conveyance of the next document starts after reading of the document of a previous page is completed, and when there is a possibility that preparation regarding image data transfer of the next page is not completed during reading in the first reading mode, the first reading mode is switched to the second reading mode.

8 Claims, 7 Drawing Sheets

IMAGE PROCESSING APPARATUS AND IMAGE PROCESSING METHOD

CROSS-REFERENCE TO RELATED APPLICATION

The present application claims priority from Japanese Application JP2023-006739, the content to which is hereby incorporated by reference into this application.

BACK GROUND OF THE INVENTION

1. Field of the Invention

The present disclosure relates to an image processing apparatus and an image processing method that enable of reading an image of a document including multiple pages sequentially page by page.

2. Description of the Related Art

An image processing apparatus that conveys a document and reads an image scans the image of the conveyed document with an image sensor to read the image as image data composed of a collection of pixels, and transfers the read image data to a memory.

A direct memory access (DMA) controller is usually used to transfer the image data to the memory. The DMA controller transfers data without a processor (central processing unit (CPU)), and data transfer using the DMA controller is referred to as DMA transfer.

The processor reserves a free area necessary for the transfer of data to the memory of the DMA transfer destination, establishes necessary settings for the DMA and the peripheral circuits, and starts the DMA controller to start the data transfer. It can be said that reserving a free area necessary for transferring image data is an essential element of memory management in an image processing apparatus that reads images of documents.

In an image processing apparatus, a synchronous dynamic random access memory (SDRAM) or the like with high-speed reading and writing is used as a memory (page memory) for accumulating data for a page. In order to store a large amount of image data, a hard disk drive (HDD) or a solid state drive (SSD), which has a lower reading and writing speed than the SDRAM, is often used. The memory management generally relates to memory management of a page memory, but memory management is also necessary for a large-capacity HDD or SDD.

For example, the following techniques have been proposed to reserve a free space in a memory for reading an image. Encoded data obtained by sequentially encoding (compressing) read image data into a variable length is stored in a memory. The data amount (code amount) of the encoded data after compression processing is compared with a predetermined reference value. The code amount from the leading edge to the end of the document is sequentially monitored, and when it is determined that the code amount exceeds the reference value, the driving of the scanner is stopped. Then, encoding is performed by applying a parameter for decoding the encoded data stored in the memory and performing encoding at a higher compression ratio (a smaller code amount). This operation is repeated until the code amount becomes equal to or less than a preset code amount. When the code amount becomes equal to or less than a preset code amount, the reading operation of the document is restarted.

SUMMARY OF THE INVENTION

In the case of an image processing apparatus that performs high-speed reading of, for example, an A4-size document at 30 to 100 pages per minute while conveying the document, it is difficult to temporarily stop the reading halfway and restart the reading without disturbing the image of the conveyed document. Therefore, it is necessary to surely end the reading of each document (each page).

In the conventional techniques, on the premise of compression processing, the amount of encoded data, i.e., the transition of the free space of a memory, is sequentially monitored while an image is read. However, it is only possible to grasp the accurate code amount only after encoding. Therefore, in high-speed image reading in which reading cannot be stopped in the middle of a page, the free space of the memory must be reserved so that reading of one page is completed even in the worst case in which compression is not performed at all. In other words, the approach of eliminating the needs to re-read the document while reducing the storage capacity to be used is suitable for relatively slow image reading, but is not suitable for fast image reading.

In DMA transfer, a processor accesses a DMA controller before data transfer, establishes settings necessary for the DMA transfer (for example, settings related to the amount of data to be transferred), and then starts the DMA controller to start the data transfer.

In an image processing apparatus, a memory area for storing processing programs to be executed by a processor and for storing data related to the processing and a memory area for storing image data have different purposes. Therefore, a memory (system memory) related to processing of the processor and a memory (image memory) for storing image data may be configured by different hardware resources. Even when they both use a common memory, the area used as the system memory and the area used as the image memory are exclusively managed so as not to overlap each other.

In such a case, even if the image memory can be reserved, the entire main memory, more specifically, the system memory sharing resources with the image memory may be exhausted. For example, in an environment in which a mechanism of a virtual memory is provided by the operating system, the system memory in the virtual space can be reserved even in a situation in which the system memory in the physical space is exhausted. However, the processing speed of the processor is reduced due to memory swap of the system memory. When memory swap occurs in a portion related to the processing of the DMA transfer, a situation may occur in which the settings of the DMA controller are not being in time for the timing at which the DMA transfer it to be performed due to the overhead caused by the memory swap.

The disclosure, which has been made in view of the circumstances as described above, provides an image processing apparatus that is able to switch a mode of image reading in accordance with the possibility of preparation for image data transfer not being in time for the timing at which image data is to be transferred.

An aspect of the disclosure provides an image processing apparatus including: a document conveyor that conveys a document including at least one page; an image reader that reads an image of the conveyed document; at least one main memory that each includes an image memory that stores image data of each read page and a system memory that stores a processing program; a data transfer circuit that performs image data transfer from the image reader to the image memory; and at least one controller that each controls reading of the image in accordance with the processing program and establishes a setting of the data transfer circuit related to the image data transfer, whereas the controller determines whether to read an image of each page in a first reading mode or a second reading mode before start of conveyance of a next document, the first reading mode being a mode in which conveyance of the next document is started before reading of an image of a previous page is completed while an image of a document including a plurality of pages is read page by page, the second reading mode being a mode in which conveyance of the next document starts after reading of the document of a previous page is completed while the image of the document including the plurality of pages is read page by page, and when there is a possibility that preparation regarding image data transfer of the next page is not completed during reading in the first reading mode, the first reading mode is switched to the second reading mode to read an image of the next page.

Another aspect of the disclosure provides a method of processing an image by a controller of an image processing apparatus, the method including: conveying a document including at least one pages and controlling reading of an image of the conveyed document by using an image reader; preparing an area of an image memory that stores image data of each read page; establishing a setting of a data transfer circuit that performs image data transfer from the image reader to the image memory; and determining whether to read an image of each page in a first reading mode or a second reading mode before start of conveyance of a next document, the first reading mode being a mode in which conveyance of the next document is started before reading of an image of a previous page is completed while each page of a document including a plurality of pages is read, the second reading mode being a mode in which conveyance of the next document starts after reading of the document of the previous page is completed while each page of the document including the plurality of pages is read, wherein when there is a possibility that preparation regarding image data transfer of the next page is not completed during reading in the first reading mode, the first reading mode is switched to the second reading mode to read an image of the next page.

In an image processing apparatus according to an aspect of the disclosure, a controller determines whether to read an image of each page in a first reading mode or a second reading mode before start of conveyance of a next document where the first reading mode is a mode in which conveyance of the next document is started before reading of an image of a previous page is completed while an image of a document including a plurality of pages is read page by page and the second reading mode is a mode in which conveyance of the next document starts after reading of the document of a previous page is completed while the image of the document including the plurality of pages is read page by page, and when there is a possibility that preparation regarding image data transfer of the next page is not completed during reading in the first reading mode, the first reading mode is switched to the second reading mode to read an image of the next page. Therefore, the image reading mode can be switched in accordance with the possibility that the preparation related to the image data transfer is not in time for the transfer.

The image processing method according to the disclosure also achieves similar advantageous effects.

DETAILED DESCRIPTION OF THE INVENTION

The disclosure will now be described in more detail with reference to the accompanying drawings. The following description is illustrative in all respects and should not be construed as limiting the disclosure.

First Embodiment

Configuration of Image Reading Device

First, an image reading device according to the present embodiment is described.

Figure 1:
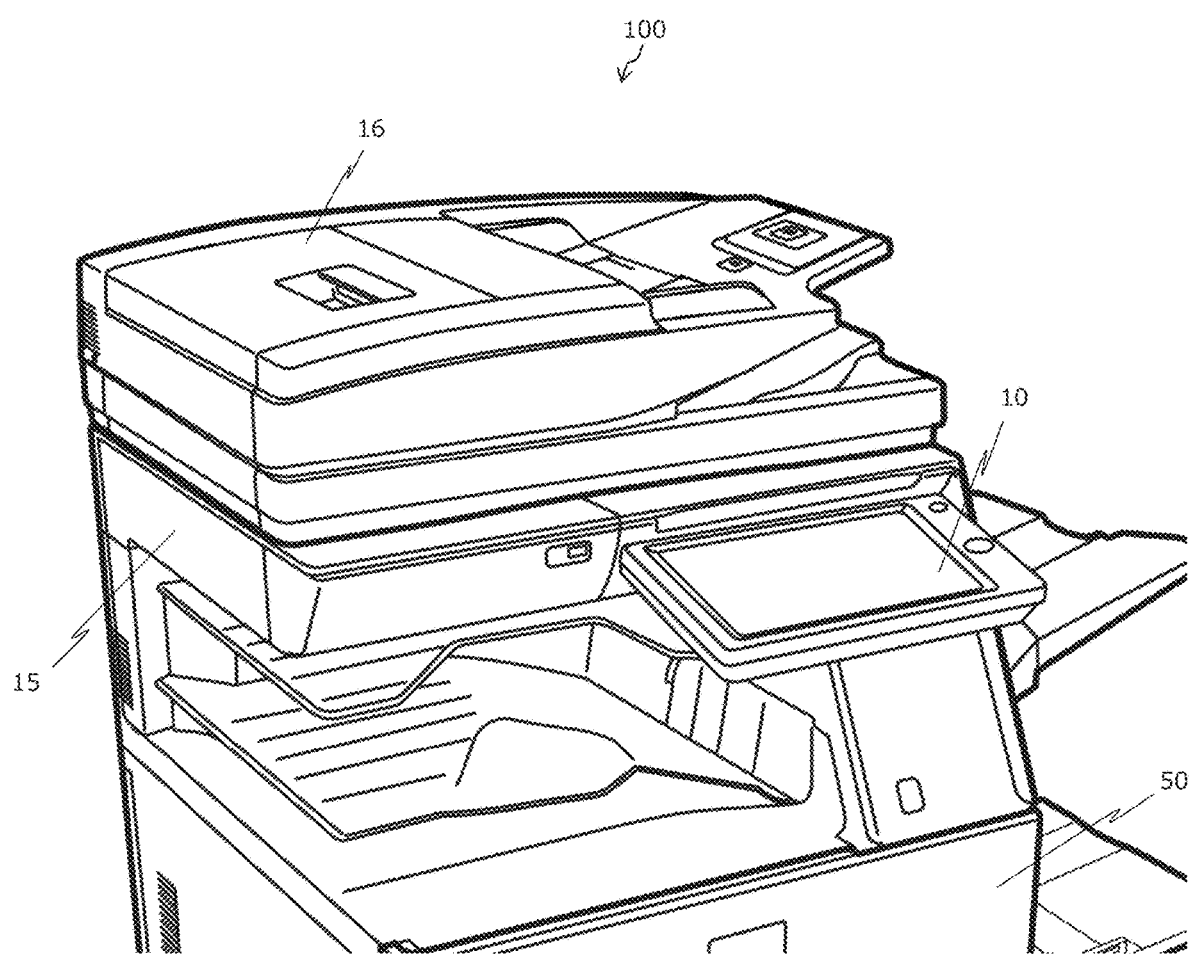
FIG. 1 is an external perspective view illustrating a multifunction peripheral as one aspect of an image processing apparatus according to the disclosure.

FIG. 1 is an external perspective diagram illustrating a portion of a multifunction peripheral as an image reading device according to the present embodiment of the disclosure. FIG. 1 illustrates a portion related to reading of a document.

Figure 3:
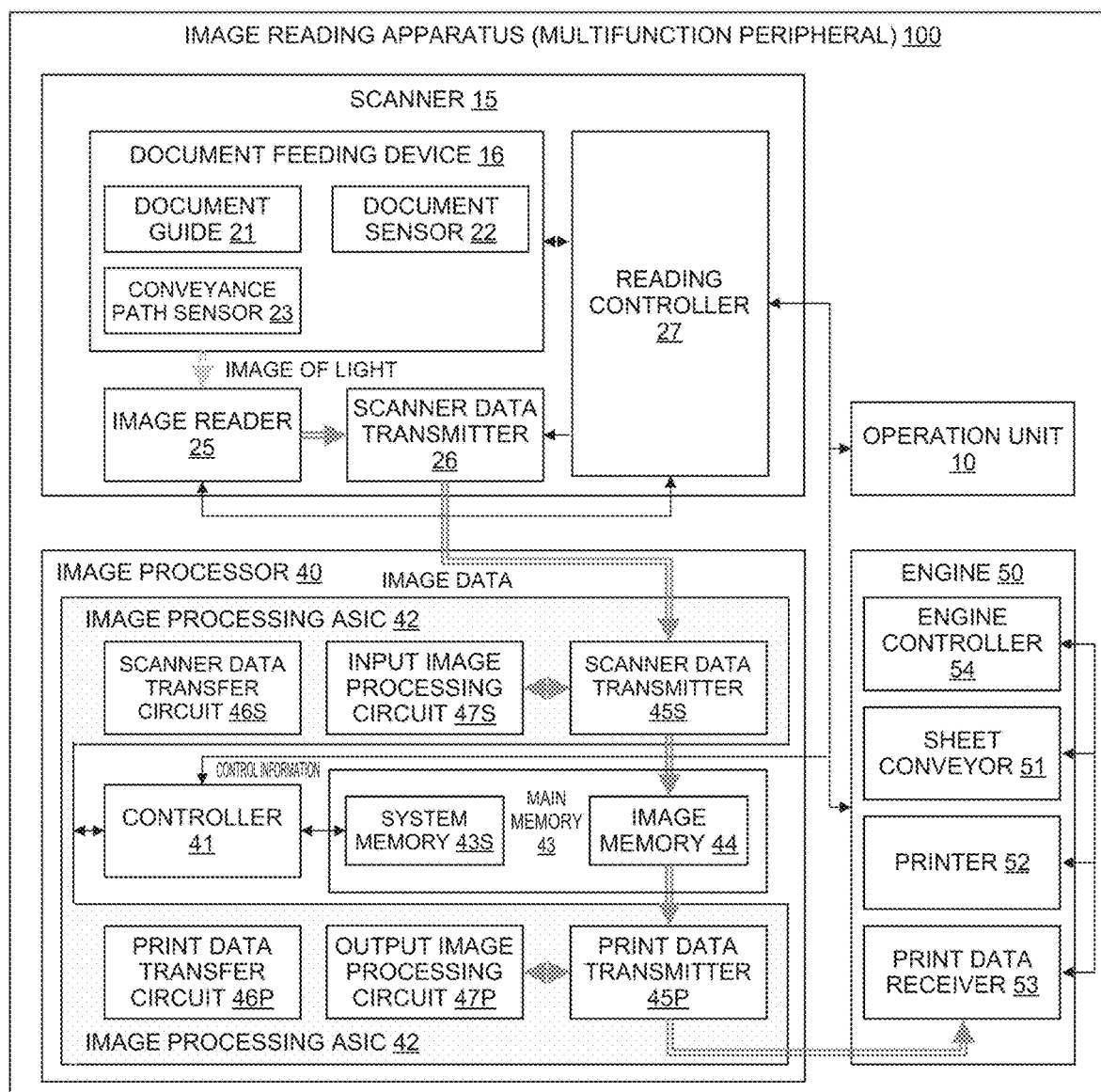
FIG. 3 is a block diagram illustrating a configuration of the multifunction peripheral illustrated in FIG. 1.

As illustrated in FIG. 1, a multifunction peripheral 100 includes a document feeder (also referred to as a single pass feeder (SPF)) as a document conveyor 16. The document conveyor 16 reads a document in cooperation with a scanner 15 including an image sensor such as a linear charge coupled device (CCD). In FIG. 3, which will be described later, the document conveyor 16 is included in the scanner 15.

Figure 2:
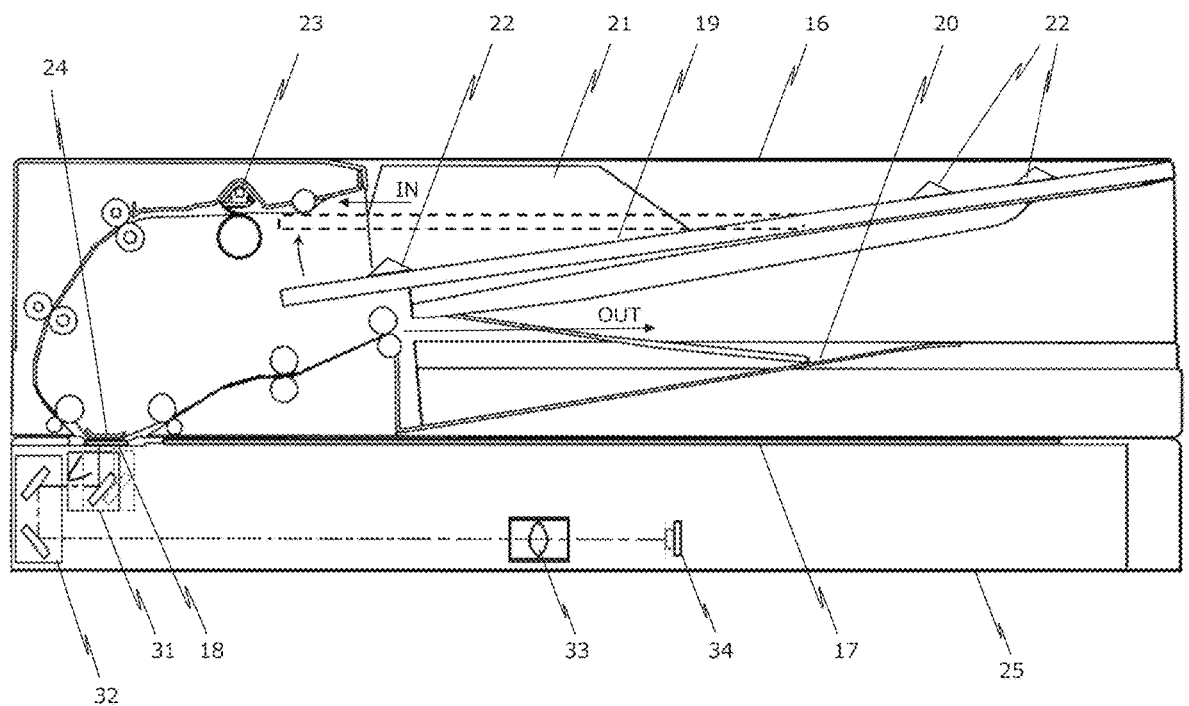
FIG. 2 illustrates a schematic configuration of a scanner and a document feeder of the multifunction peripheral illustrated in FIG. 1.

FIG. 2 illustrates a schematic configuration of the scanner 15 and the document conveyor 16 of the multifunction peripheral 100 illustrated in FIG. 1.

As illustrated in FIG. 2, an image reader 25 includes a document table 17 which is formed of an upper transparent glass plate on which a document is placed when a book or the like is read in a platen mode. An SPF reading window 18 is positioned adjacent to the left end of the document table 17. The SPF reading window 18 is formed of a transparent glass plate similarly to that of the document table 17. The document conveyor 16 can be opened upward so that the document table 17 is exposed when a document is placed on the document table 17, but is closed in an SPF mode in which a document is read using the document conveyor 16 to reads an image of the document passing through the SPF reading window 18.

In the SPF mode, the document conveyor 16 illustrates in FIG. 2 separates and feeds documents one by one from a document bundle set at a predetermined position in a document set tray 19 (see arrow IN in FIG. 2), conveys the document through a reading position 24, and outputs the document to a document output tray 20 (see arrow OUT in FIG. 3).

The document set tray 19 includes a document guide 21 and a document sensor 22 to detect the presence and the size of the document. The document guide 21 adjusts the width in the main scanning direction orthogonal to the document feeding direction. The document sensor 22 detects the presence of a document at multiple positions in the sub-scanning direction along the feeding direction. Midway of the conveyance path from the document set tray 19 to the reading position 24, a conveyance path sensor 23 that detects passage of a document is provided. The conveyance path sensor 23 detects the timing at which the leading edge of the document passes through the position and also detects the size of the passing document in the sub-scanning direction.

The image reader 25 includes a first carriage 31 positioned below the reading position 24 and on which an LED for irradiating a document surface and a reflection mirror are mounted, a second carriage 32 on which two reflection mirrors are mounted, an optical lens 33, and an image sensor 34. The image reader 25 forms an image of the document passing through the reading position 24 on the image sensor 34 and reads the image of the document. The image reader 25 including the image sensor 34 outputs an image signal (image data) corresponding to the document image.

The first carriage 31 is movable to a position below the document table 17, and scans a document placed on the document table 17 from below to read an image of the document in the platen mode.

FIG. 3 is a block diagram illustrating the configuration of the multifunction peripheral 100. The multifunction peripheral 100 includes an operation unit 10, a scanner 15, an image processor 40, and an engine 50.

The operation unit 10 includes an operation input device, such as a liquid crystal display device or a touch panel, and is provided on a housing of the multifunction peripheral 100, as illustrated in FIG. 1. The operation unit 10 displays a screen according to the control of the controller 41 and detects a user's operation on the screen. The controller 41 recognizes an operation detected by the operation input device.

The scanner 15 includes a scanner data transmitter 26 and a reading controller 27 in addition to the document conveyor 16 and the image reader 25 described above. The document conveyor 16 conveys a document to the reading position 24 where the image sensor 34 reads the document and outputs the document. The image reader 25 optically reads an image of a document with the image sensor 34, converts the read image into digital data (image data), performs appropriate correction on the digital data, and outputs the digital data. The scanner data transmitter 26 is a circuit that transmits the image data output from the image reader 25 to the image processor 40 by using a data transfer method such as Flat Panel Display Link (FPD-LINK) (registered trademark). The reading controller 27 controls the operation of the scanner 15 to read a document image and transmit the read document image to the image processor 40. The reading controller 27 communicates with the controller 41 in order to control the timing of starting the feeding of the document and the like. As hardware, for example, one or more microcontrollers are applied.

The image processor 40 includes one or more controllers 41, one or more image processing application specific integrated circuits (ASIC) 42, and at least one main memory 43. The main memory 43 includes a system memory 43S and an image memory 44.

The controller 41 includes, as hardware, one or more processors and peripheral circuits such as input/output circuits and timer circuits. The processor executes a processing program stored in the system memory 43S to provide the function of the controller 41.

The image processing ASIC 42 is an integrated circuit having a circuit for image processing, and includes data transfer circuits for transferring image data to the image memory 44. The data transfer circuits are a scanner data transfer circuit 46S and a print data transfer circuit 46P are provided. The data transfer circuits include a DMA controller. Furthermore, the image processing ASIC 42 includes a scanner data receiver 45S that receives the image transferred from the scanner data transmitter 26 of the scanner 15, and a print data transmitter 45P that transmits the image data to the engine 50. The image processing ASIC 42 includes image processing circuits that perform image processing and compression processing on the image data stored in the image memory 44. The image processing circuits are an input image processing circuit 47S and an output image processing circuit 47P.

The system memory 43S is a memory for storing the processing programs to be executed by the controller 41 and data required for the processing, and one or more DRAMs such as SDRAMs. The image memory 44 is a memory for storing image data of a document received from the scanner 15, intermediate image data generated in the process of image processing, image data compressed to be stored in a storage such as an HDD or an SSD, and the like. As the image memory 44, one or more DRAMs such as SDRAMs are applied.

In addition to the main memory 43 including the system memory 43S and the image memory 44, the image processor 40 includes a nonvolatile memory (not illustrated in FIG. 3) that can be read and written by the controller 41.

The engine 50 includes a sheet conveyor 51, a printer 52, a print data receiver 53, and an engine controller 54. The sheet conveyor 51 conveys and outputs a sheet for printing to the printer. The printer 52 receives image data rendered by the image processor 40, visualizes the image data, and prints the visualized image data on a print sheet. An example of a method of visualizing image data is an electrophotographic visualization method using a semiconductor laser or a light emitting device (LED) as a light source.

The print data receiver 53 is a circuit that receives image data read from the image memory 44 and transferred using a data transfer method such as Flat Panel Display Link (FPD-LINK) (registered trademark), and passes the image data to the printer.

Sequence of First Reading Mode

A processing procedure for sequentially reading multiple single-sided documents with the multifunction peripheral described with reference to FIGS. 1 to 3 will now be explained. First, the procedure of the first reading mode will be explained.

Figure 4:
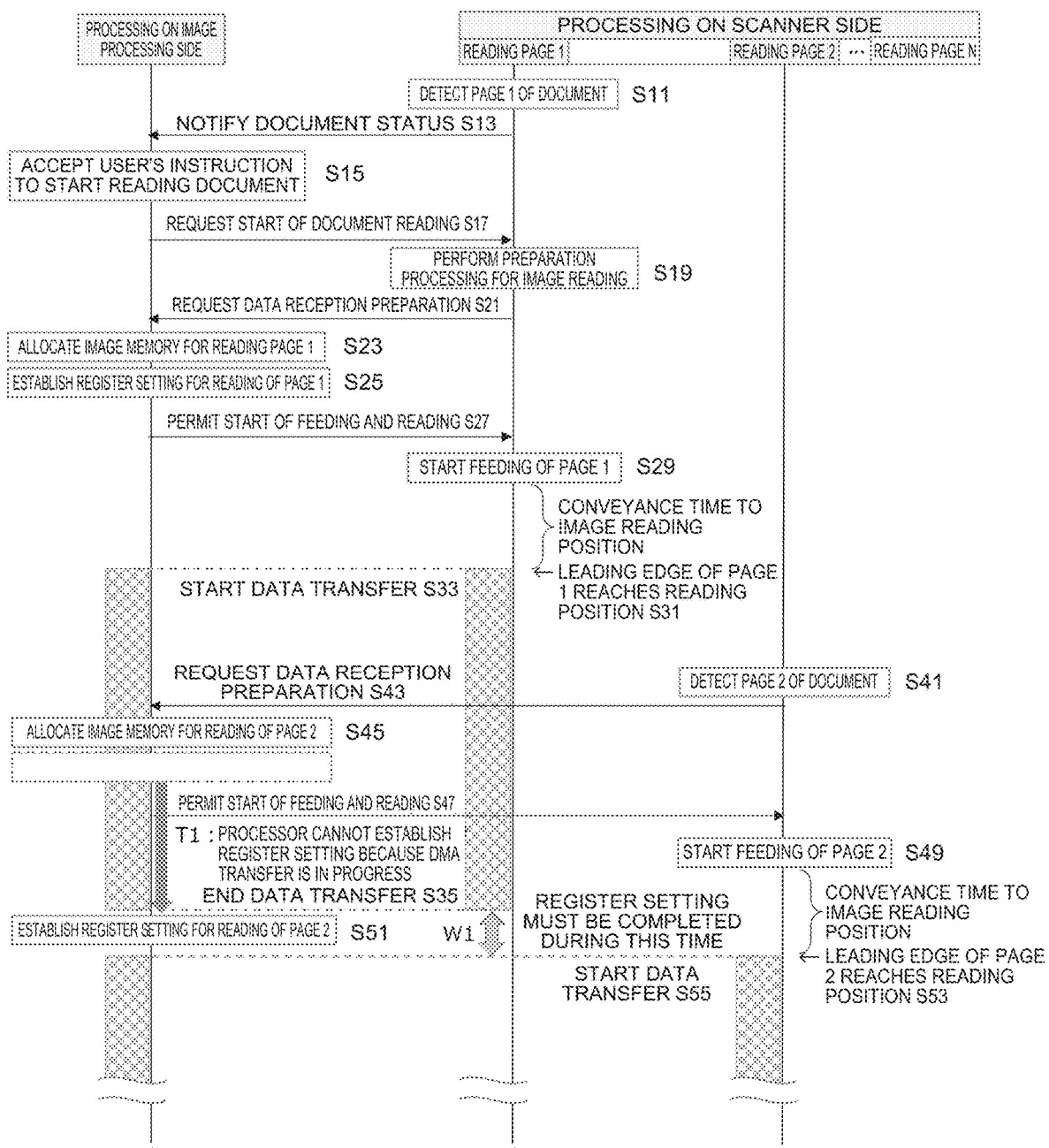
FIG. 4 is a sequence diagram illustrating the order of processing when the multifunction peripheral illustrated in FIG. 1 reads a document in a first reading mode.

FIG. 4 is a sequence diagram illustrating the order of processing when the multifunction peripheral illustrated in FIG. 1 reads a document in the first reading mode.

Three vertical lines are illustrated in the sequence diagram shown in FIG. 4. The vertical line on the left indicates the processing performed at the image processor 40. The vertical lines at the center and on the right indicate the processing performed at the scanner 15. Of these, the vertical line at the center indicates the processing related to reading of the first sheet (the first page), and the vertical line on the right indicates the processing related to reading of the second sheet (the second page). The processing for the third and subsequent pages is the same as that for the second page, and therefore is not illustrated. The events that occur and the processing executed are illustrated in chronological order from the top to the bottom of the vertical lines.

When a user sets a document to be read on the document set tray 19 of the document conveyor 16, the document sensor 22 detects a state in which at least one document is set (see S11). The reading controller 27 notifies the controller 41 of the image processor 40 about this state together with information on the document size (see S13). Upon recognizing that the document is set, the controller 41 causes the operation unit 10 to display that a job related to image reading can be started, and waits for an instruction to start the reading by the user. Upon accepting such an instruction, the controller 41 performs processing related to preparation for image reading of the document. As one of the processes, the controller 41 sends a document reading start request including parameters such as reading resolutions to the scanner 15 (see S17). Upon receiving the document reading start request is received, the reading controller 27 performs preparation processing for image reading by the scanner 15 (see S19). For example, the settings of the image reader 25 and the scanner data transmitter 26 are established in accordance with the job settings and the document size, and the document set tray 19 is brought into a feedable state.

When the preparation for image reading is completed, the reading controller 27 transmits a data reception preparation request to the controller 41 (see S21), and requests the controller 41 to prepare for receiving the image data transmitted from the scanner data transmitter 26. In response to this, the controller 41 reserves an area in the image memory corresponding to the document size and prepares for reception of image data of the first page of the document (see S23). Furthermore, the controller 41 establishes the register settings of the scanner data transfer circuit 46S in preparation for the reception of the image data of the first page of the document (see S25). When the image processor 40 is ready, the controller 41 transmits a feeding/reading start permission to the scanner 15 (step S27), and permits the scanner 15 to feed and read a document and transmit image data.

Upon receiving the feeding/reading start permission from the controller 41, the reading controller 27 starts feeding (conveying) the document of the first page (see S29).

As is apparent from the configuration of the document conveyor 16 illustrated in FIG. 2, the leading edge of the document reaches the reading position 24 after a predetermined time has elapsed from the start of feeding of the document (see S31). The reading controller 27 controls the start of image reading on the assumption that the leading edge of the conveyed document reaches the reading position 24 after a predetermined time elapses from the detection of the leading edge by the conveyance path sensor 23 (see S33).

When the image sensor 34 starts reading, the read image data is input to the scanner data transmitter 26, and transfer of the image data to the scanner data receiver 45S is started. The image processor 40 receives the transferred image data and sequentially stores the image data in an area of the image memory 44 reserved in advance. When the reading of the area corresponding to the document size of the first page is completed, the image data transmission is completed (see S35). The reading controller 27 establishes the settings of the image reader 25 in advance, and the controller 41 establishes the register of the scanner data transfer circuit 46S in advance.

Before the reading of the first page is finished, the passage of the trailing edge of the first page document is detected by the conveyance path sensor 23. At this time, the reading controller 27 determines whether or not the document of the next page (the second page) is present in the document set tray 19 on the basis of detection by the document sensor 22 (see S41). The reading controller 27 sends the determination result to the controller 41 of the image processor 40 (see S43). If there is a next page, the determination result is sent together with information about the document size and the like. If there is a next page, the controller 41 should reserve an image memory area for the next page (see S45) in preparation of reception of the image data and establish the register settings of the scanner data transfer circuit 46S (see S47) in preparation for reception of the next page. In the example illustrated in FIG. 4, it is assumed that the image memory for the next page has a margin and there is a free area for storing the image data of the next page.

However, at the time when the data reception preparation request for the document of the next page is received from the reading controller 27, the trailing edge of the document of the first page has not yet reached the reading position 24, and the image data of the first page is being transferred. The scanner data transfer circuit 46S is used for image data transfer. The controller 41, which is a processor, cannot set the register of the scanner data transfer circuit 46S for the next page (see T1).

However, there is a document of the next page, and it is in a feedable state. In the case of the first reading mode, when the area of the image memory for storing the document of the next page is reserved, the controller 41 transmits a feeding/reading start permission to the scanner 15 (step S47). That is, the scanner 15 is permitted to feed and read a document and transmit image data.

Upon receiving the feeding/reading start permission from the controller 41, the reading controller 27 starts feeding the document of the next page (see S49).

In the example illustrated in FIG. 4, before the leading edge of the next page reaches the reading position, the trailing edge of the first page passes through the reading position 24, and the data transfer ends (see S35). When the data transfer of the first page is completed, the controller 41 establishes register settings of the scanner data transfer circuit 46S for the next page (see S51). Then, when the leading edge of the next page reaches the reading position 24 (see S53), the reading controller 27 controls the start of image reading, and the transfer of the image data of the read next page starts (see S55). The controller 41 needs to establish the register settings of the scanner data transfer circuit 46S during a temporal window W1 from the end of the data transfer of the first page (S35), i.e., when the trailing edge of the first page passes through the reading position 24 to when the leading edge of the next page reaches the reading position 24.

Subsequently, for the second and subsequent pages, the same events and processes as from S41 to the S55 are repeated in the same order between the data transfer start (S33) and the data transfer end (S35) of the first page.

At the time when the conveyance path sensor 23 detects the passage of the trailing edge of the document of the last page, the document sensor 22 detects that there is no document on the document set tray 19. Since there is no document of a next page, the reading controller 27 recognizes that the document being conveyed is the last page.

When the data transfer of the last page is completed, the controller 41 is notified that the reading is completed. The controller 41 reads the image data of the last page, processes the read image data, and ends the job.

Figure 5:
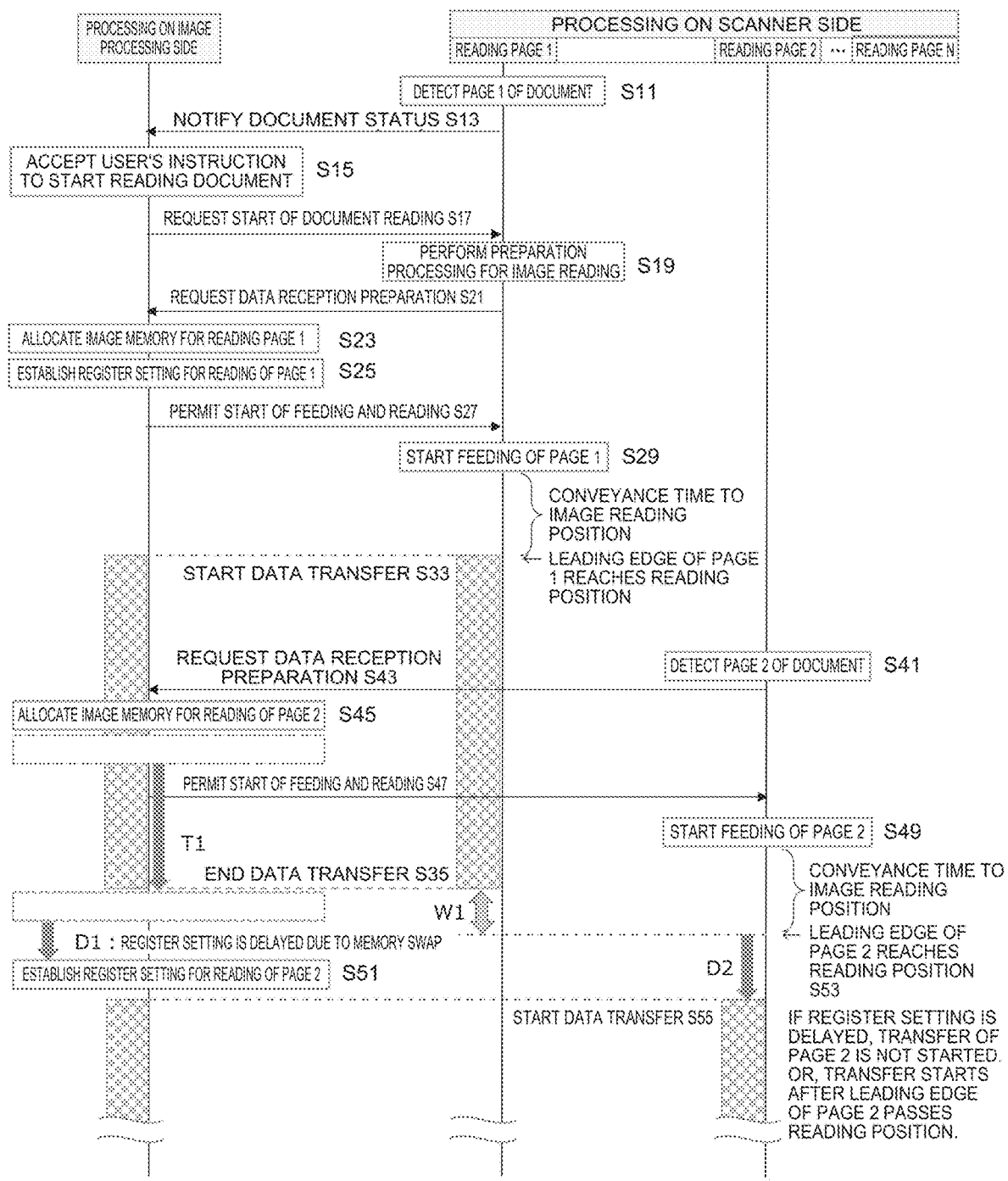
FIG. 5 is a diagram corresponding to the sequence diagram of FIG. 4, and illustrates a case where register setting for reading the second page is delayed due to memory swap.

FIG. 5 is a sequence diagram of when a document is read in the first reading mode, as in FIG. 4. Events and processes corresponding to those in FIG. 4 are denoted by corresponding reference numerals. FIG. 4 illustrates a case in which the controller 41 establishes the register settings of the scanner data transfer circuit 46S during the window W1 from when the trailing edge of the previous page passes through the reading position 24 to when the leading edge of the next page reaches the reading position 24. On the other hand, FIG. 5 illustrates a case in which the processing program related to the register settings is swapped out at the time when the trailing edge of the previous page passes through the reading position 24, a time delay (see D1 illustrated in FIG. 5) due to swap-in occurs, and the register settings cannot be established by the controller 41 during the window W1.

Even when the swap-in of the processing program is completed and the controller 41 establishes the register settings for starting the transfer of the next page in the scanner data transfer circuit 46S (see S51 in FIG. 5), the transfer of the image data of the next page does not start because the leading edge of the next page has already passed through the reading position 24, and it is not the appropriate timing for starting the image data transfer. There may be a configuration in which the transfer of the image data can be started even after the leading edge of the page has passed through the reading position 24. However, even in such a configuration, there is a time delay (see S53 in FIG. 5) after the leading edge passes through the reading position 24 (see D2 in FIG. 5), and as a result, the image data of the leading edge portion is lost.

Sequence of Second Reading Mode

Figure 6:
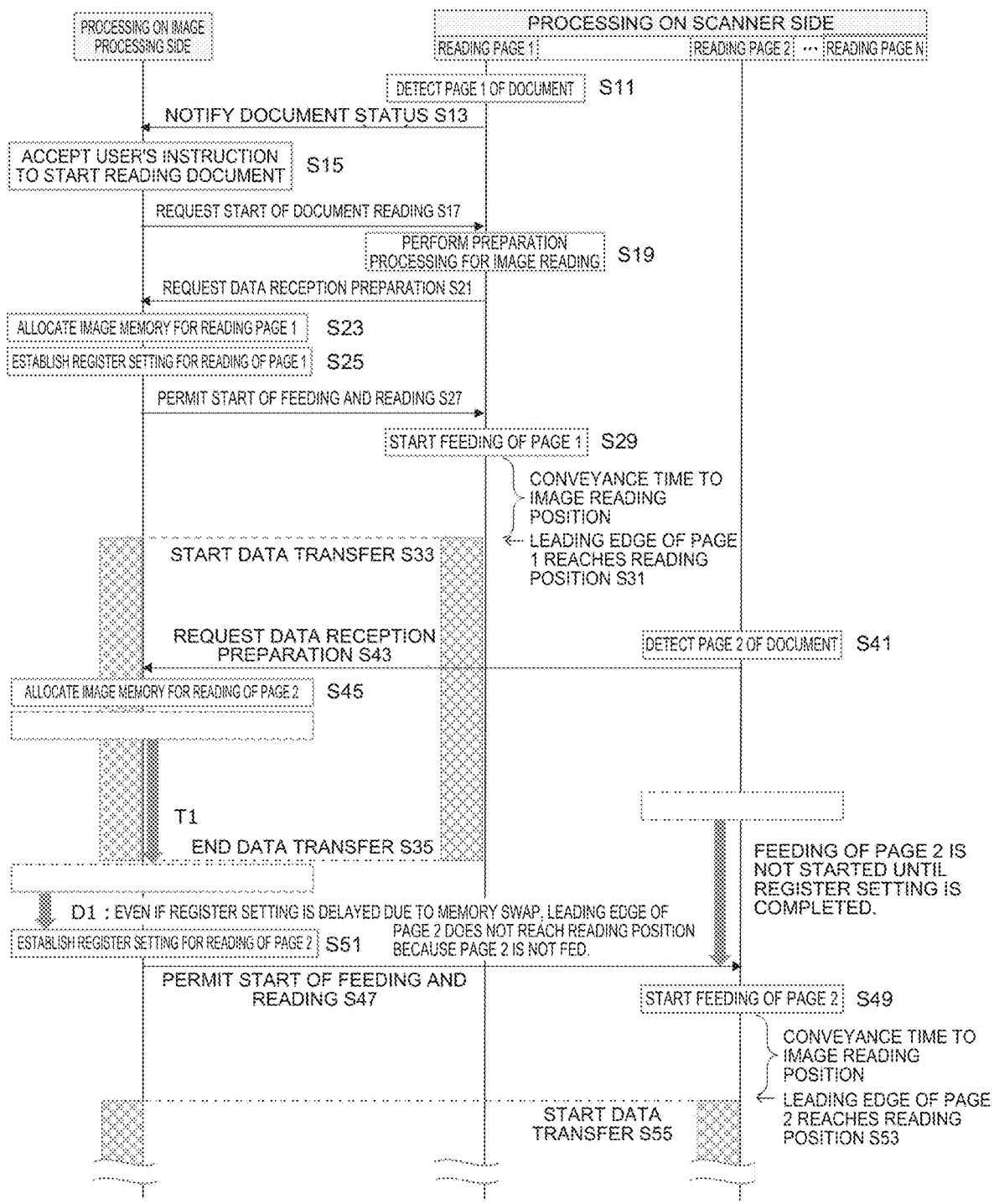
FIG. 6 is a sequence diagram illustrating the order of processing when the multifunction peripheral illustrated in FIG. 1 reads a document in a second reading mode.

FIG. 6 is a sequence diagram of when a document is read in the second reading mode. Events and processes corresponding to those in FIGS. 4 and 5 are denoted by corresponding reference numerals. In the case of the second reading mode, the controller 41 not only reserves an area of the image memory for storing the document of the next page, but also transmits a feeding/reading start permission to the scanner 15 after establishing the register settings for the reading of the next page in the scanner data transfer circuit 46S (see S47 in FIG. 6).

Even if the area of the image memory for storing the document of the next page is reserved (see S41) at the time when the trailing edge of the previous page passes through the conveyance path sensor 23 and the reading controller 27 determines that there is a document of the next page (see S45), the document of the next page is not fed at that time. The controller 41 waits for the completion of the register settings (see S51 in FIG. 6) and transmits a feeding/reading start permission (see S47 in FIG. 6), and the reading controller 27 feeds the document of the next page on the basis of the permission (see S49 in FIG. 6). Therefore, unlike the first reading mode illustrated in FIG. 5, the leading edge of the document of the next page does not reach the reading position 24 while the register settings for reading the next page is not completed. After the register settings for reading the next page is completed (see S51 in FIG. 6), the next page is fed (see S49 in FIG. 6), the leading edge of the next page reaches the reading position 24 (see S53 in FIG. 6), and data transfer for reading the next page is started (see S55 in FIG. 6).

With reference to FIG. 4, in the first reading mode, the trailing edge of the previous page passes through the conveyance path sensor 23, and the reading controller 27 determines that there is a document of the next page (see S41), and in a state in which an image memory of the next page is reserved, the reading controller 27 starts feeding of the next page without an interval (see S49). After the feeding of the next page is started, when the trailing edge of the previous page passes through the reading position and the data transfer of the previous page is completed (see S35), the controller 41 establishes the register settings of the next page (see S51).

In the second reading mode, even in a case where there is no delay due to memory swapping or the like, the reading controller 27 starts feeding the next page (see S51 in FIG. 6) after the controller 41 establishes the register settings for reading the next page (see S49 in FIG. 6). In other words, the feeding of the next page is started after the trailing edge of the previous page passes through the reading position 24.

Therefore, in the second reading mode, the timing of the starting of the feeding of the next page is later than that in the first reading mode, and the amount of reading of the document per unit time is smaller than that in the first reading mode.

Therefore, the controller 41 switches between the first reading mode and the second reading mode depending on the situation.

Switching Between First Reading Mode and Second Reading Mode

Figure 7:
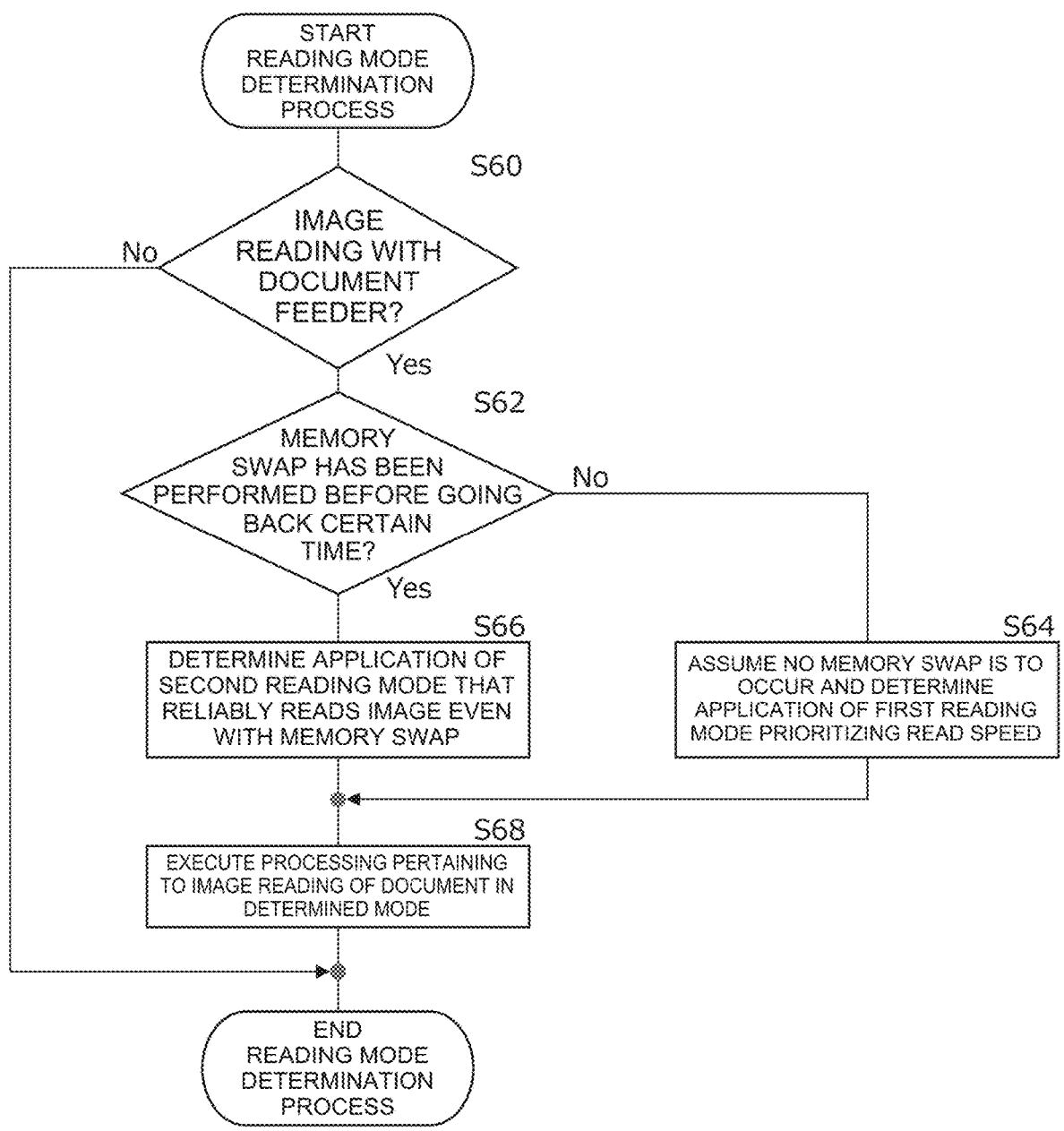
FIG. 7 is a flowchart illustrating an example of a process in which the controller illustrated in FIG. 3 switches between the first reading mode and the second reading mode.

FIG. 7 is a flowchart illustrating an example of a process (reading mode determination process) in which the controller 41 determines whether to read an image in the first reading mode or the second reading mode.

The reading mode determination process may be executed, for example, when the controller 41 receives a document state notification (see S13 in FIG. 4) from the scanner 15 in the example of the processing procedure illustrated in FIG. 4. In this case, each time a job related to reading is executed, the reading mode is determined first. More preferably, the controller 41 executes the reading mode determination process when receiving a data reception preparation request from the scanner 15 (see S19 and S43 in FIG. 4). This process is to determine the reading mode for each page during preparation of the reading of each page.

As illustrated in FIG. 7, in the case of image reading using the document conveyor 16 (Yes in step S60), the controller 41 checks whether or not memory swap has occurred in a predetermined time (for example, 15 minutes) before the image reading. In this embodiment, the memory swap is provided as a function of a virtual memory provided by the operating system (OS). When memory swap occurs, the OS stores a history of the memory swap in, for example, a nonvolatile memory so that the controller 41 can refer to the history later. In step S62, the determination is performed with reference to the history.

If there is no history of memory swap occurring during the predetermined period (No in step S62), the controller 41 determines that the main memory 43, more specifically, the system memory 43S is not in an exhausted state and determines to perform image reading in the first reading mode (step S64).

On the other hand, if there is a history of memory swap occurring during the predetermined period (Yes in step S62), the controller 41 determines that a situation in which the main memory 43, more specifically, the system memory 43S is exhausted may occur even during the image reading. Then, the controller 41 determines that the image reading is performed in the second reading mode in which the image can be surely read even when memory swap occurs (step S66).

As described above, when it is determined in which mode the image is read, the controller 41 executes processing related to the reading of the document in the determined mode. That is, in a case where an image is read in the first reading mode, processing relating to reading of a document is executed, as illustrated in FIG. 4. Meanwhile, in a case where an image is read in the second reading mode, processing relating to reading of a document is executed, as illustrated in FIG. 6.

In place of determining whether or not memory swap has occurred in step S62 described above, the controller 41 may monitor whether or not there is a predetermined amount or more of free space in the main memory 43 and determine the depletion status of the main memory 43 on the basis of the history.

The above is an example of the reading mode determination process.

Second Embodiment

In the first embodiment, documents set on the document set tray 19 are conveyed one by one to the reading position 24 along a conveyance path, as illustrated in FIG. 2, and are output to the document output tray 20.

Some document feeders have a registration mechanism for correcting skew feeding of a document by forming a bend in the middle of a conveyance path.

The registration mechanism temporarily stops the document midway of the conveyance path in order to bend the document. In the case of the document feeder having the registration mechanism, the document feeding in S29 and S49 of FIG. 4 indicates not the feeding from the document set tray 19 but the feeding from a state in which the feeding is temporarily stopped at the registration mechanism.

Therefore, a document feeder including a registration mechanism in the conveyance path is also included in the scope of the disclosure.

Third Embodiment

Although the first embodiment has been described on the assumption of a single-sided document, in order to read both surfaces of a document, some document feeder further include a dedicated image sensor for reading a document surface (hereinafter referred to as a second surface) opposite to a document surface (hereinafter referred to as a first surface) to be read by the image sensor 34.

In the case of such a document feeder, in a simplified explanation, the image reader 25 transfers the image data of the second surface to the image processor 40 in parallel with the image data of the first surface. To read two pages obtained by combining the first and second surfaces of each document in the same time as reading each page of a single-sided document.

However, although the first side and the second side are read substantially at the same time, it can be said that the sequence diagrams in FIGS. 4 to 6 illustrate similar events and processes for the first side of the respective documents.

Therefore, a document feeder that simultaneously reads both sides of a document is also included in the scope of the disclosure.

As described above, according to the embodiments of the disclosure, even when an image memory required for transfer is reserved, it is possible to avoid the occurrence of a situation in which the processing program for setting the data transfer circuit is swapped out and the swap-in is not in time.

The swap-out and swap-in processes require time, but the next document started to be conveyed cannot be stopped at any position. There is a risk that the setting of the data transfer circuit is not completed even when the document reaches the reading position and that the document passes through the reading position while the image data is not transferred. However, the risk can be avoided by starting the conveyance of the document after the setting of the transfer circuit is completed depending on the situation.

The memory swap may be generated by the controller executing a virus scan.

In general, a large capacity memory area is required for the virus scan processing, and therefore there is a possibility that the processing program for setting the data transfer circuit is swapped out.

The memory swap may be generated by executing a character recognition process on an image read by the controller.

In general, a large capacity memory area is required for the character recognition processing, and therefore, there is a possibility that the processing program for setting the data transfer circuit is swapped out.

Alternatively, the image processing apparatus may include a printer that expands print data acquired from an external device into image data and performs printing, and the memory swap may occur by executing rendering processing for expanding the print data into the image data. In a case where the image processing apparatus is a multifunction peripheral that also performs printing, the controller performs processing (rendering processing) for expanding the print data acquired from an external device via communication or a medium such as a USB memory and obtaining printable image data. In general, a large capacity memory area is required for processing for expanding print data, and therefore, there is a possibility that the processing program for setting the data transfer circuit is swapped out.

The image processing apparatus may further have a function as a virtual server, and the memory swap may be generated by the controller executing the function as the virtual server.

For example, there is a mode in which a multifunction peripheral has a function as a virtual server, such as a web server or a print server, in addition to a function as a scanner or a printer.

However, some of the functions of such a virtual server require a large capacity memory area, and therefore, there is a possibility that the processing program for establishing the settings of the data transfer circuit is swapped out.

It should be understood that the disclosure includes combinations of any of the above-described aspects.

Various modifications can be made to the disclosure in addition to the above-described embodiments. The modifications should not be construed as falling outside the scope of the disclosure. The invention according to the disclosure should include meanings equivalent to the claims and all modifications belonging to the scope of the disclosure.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image processing apparatus comprising:
a document conveyor that conveys a document including at least one page;
an image reader that reads an image of the conveyed document;
at least one main memory that each includes an image memory that stores image data of each read page and a system memory that stores a processing program;
a data transfer circuit that performs image data transfer from the image reader to the image memory; and
one or more controllers that each control reading of the image in accordance with the processing program and establish a setting of the data transfer circuit related to the image data transfer, whereas
the controllers determine whether to read an image of each page in a first reading mode or a second reading mode before start of conveyance of a next document,
the first reading mode being a mode in which conveyance of the next document is started before reading of an image of a previous page is completed while an image of a document including a plurality of pages is read page by page, the second reading mode being a mode in which conveyance of the next document starts after reading of the document of a previous page is completed while the image of the document including the plurality of pages is read page by page, and
when there is a possibility that preparation regarding image data transfer of the next page is not completed during reading in the first reading mode, the first reading mode is switched to the second reading mode to read an image of the next page.

2. The image processing apparatus according to claim 1, wherein,
the main memory is subjected to memory management to dynamically reserve the image memory and the system memory,
the first reading mode is a mode in which conveyance of the next document starts when the image memory required for transfer is reserved,
the second reading mode is a mode in which conveyance of the next document starts after the image memory required for transfer is reserved and setting of the data transfer circuit is completed,
the controllers determine whether or not there is free space of a predetermined amount or more in the main memory before conveyance of the next document starts, and
an image of the next page is read in the first reading mode when there is free space of a predetermined amount or more and is read in the second reading mode when the amount of free space is less than the predetermined amount.

3. The image processing apparatus according to claim 1, wherein,
the main memory is subjected to memory management to dynamically reserve the image memory and the system memory,
the first reading mode is a mode in which conveyance of the next document starts when the image memory required for transfer is reserved,
the second reading mode is a mode in which conveyance of the next document starts after the image memory required for transfer is reserved and setting of the data transfer circuit is completed,
the controllers determine whether or not memory swap has occurred in the main memory before start of conveyance of the next document, and
an image of the next page is read in the first reading mode when no memory swap has occurred and is read in the second reading mode when memory swap has occurred.

4. The image processing apparatus according to claim 3, wherein the memory swap occurs by the controllers executing a virus scan.

5. The image processing apparatus according to claim 3, wherein the memory swap occurs by executing a character recognition process on an image read by the controllers.

6. The image processing apparatus according to claim 3, further comprising a printer that expands print data acquired from an external device into image data and performs printing,
wherein the memory swap occurs by executing a rendering process that expands the print data into image data.

7. The image processing apparatus according to claim 3, further comprising a function as a virtual server,
wherein the memory swap occurs by the controllers executing the function as the virtual server.

8. A method of processing an image by one or more controllers of an image processing apparatus, the method comprising:
conveying a document including at least one pages by using a document conveyor;
controlling reading of an image of the conveyed document by using an image reader;
preparing an area of an image memory that stores image data of each read page;
establishing a setting of a data transfer circuit that performs image data transfer from the image reader to the image memory; and
determining whether to read an image of each page in a first reading mode or a second reading mode before start of conveyance of a next document, the first reading mode being a mode in which conveyance of the next document is started before reading of an image of a previous page is completed while each page of a document including a plurality of pages is read, the second reading mode being a mode in which conveyance of the next document starts after reading of the document of the previous page is completed while each page of the document including the plurality of pages is read,
wherein when there is a possibility that preparation regarding image data transfer of the next page is not completed during reading in the first reading mode, the first reading mode is switched to the second reading mode to read an image of the next page.

* * * * *